US008335579B2

(12) United States Patent
Lin

(10) Patent No.: US 8,335,579 B2
(45) Date of Patent: Dec. 18, 2012

(54) RESTORING CORRUPTED AUDIO SIGNALS

(76) Inventor: Han Lin, Cambridge (GB)

( * ) Notice: Subject to any disclaimer, the term of this patent is extended or adjusted under 35 U.S.C. 154(b) by 1414 days.

(21) Appl. No.: 11/916,446

(22) PCT Filed: Jun. 15, 2006

(86) PCT No.: PCT/GB2006/002190
§ 371 (c)(1),
(2), (4) Date: Dec. 3, 2007

(87) PCT Pub. No.: WO2006/134366
PCT Pub. Date: Dec. 21, 2006

(65) Prior Publication Data

US 2008/0187153 A1 Aug. 7, 2008

(30) Foreign Application Priority Data

Jun. 17, 2005 (GB) .................................. 0512397.1
Mar. 17, 2006 (GB) .................................. 0605446.4

(51) Int. Cl.
*G06F 17/00* (2006.01)
(52) U.S. Cl. ........................................................ 700/94
(58) Field of Classification Search ..................... 700/94
See application file for complete search history.

(56) References Cited

U.S. PATENT DOCUMENTS 6,263,371 B1 7/2001 Geagan et al.
2005/0015242 A1 1/2005 Gracie et al.
2005/0123150 A1* 6/2005 Betts ............................ 381/94.3

FOREIGN PATENT DOCUMENTS

WO WO 03065361 A2 * 8/2003

OTHER PUBLICATIONS

Digital Audio Restoration—a staistical model based approach; Simon J. Godsill and Peter J. W. Rayner; Sep. 21, 1998.*
Cheng-Chieh Lee; "Diversity Control Among Multiple Coders: A Simple Approach to Multiple Descriptions", Speech Coding, 2000; I EEE Workshop; pp. 69-71.
International Search Report received in corresponding PCT Application No. PCT/GB/2005/002190 dated Aug. 10, 2006.

* cited by examiner

*Primary Examiner* — Andrew C Flanders
(74) *Attorney, Agent, or Firm* — Knobbe, Martens, Olson & Bear LLP

(57) ABSTRACT

A method of restoring a corrupted audio signal includes the steps of inputting the corrupted audio signal in a first channel, inputting one or more further correlated audio signals in one or more further channels, and restoring the corrupted audio signal using a Multi-Channel Autoregressive (AR) Model that models the corrupted signal as a linear combination of scaled time shifted portions of the further signal(s) and the corrupted signal. Embodiments are described in which the method is used to improve received audio signals in DAB receivers and mobile telephones.

18 Claims, 5 Drawing Sheets

RESTORING CORRUPTED AUDIO SIGNALS

CROSS-REFERENCE TO RELATED APPLICATIONS

This application is the U.S. National Phase under 35 U.S.C. §371 of International Application No. PCT/GB2006/002190, filed Jun. 15, 2006, designating the United States and published in English on Dec. 21, 2006, as WO 2006/134366, which claims priority to United Kingdom Application No. 0512397.1, filed Jun. 17, 2005 and United Kingdom Application No. 0605446.4, filed Mar. 17, 2006.

FIELD OF THE INVENTION

The invention relates to a method of and apparatus for restoring corrupted audio signals. One application of the invention is in improving digital audio broadcast (DAB) reception with the aid of corresponding analogue FM/AM signals, that is where the same programme is transmitted over both a DAB channel and an analogue FM/AM channel. Further applications of the invention include mobile telephones and voice over internet protocol (VOIP) telephones.

DESCRIPTION OF RELATED ART

Most audio recording consists of at least two independent audio channels. Many modern digital audio recordings even contain 7.1 independent surround sound channels. Although industrial audio coding applications such as MPEG take advantage of the audio redundancy model, a full exploitation remains difficult.

Data contained in a channel can be corrupted when the original media is damaged or during data transmission. A corrupted audio file can contain clicks, pops, or crackles, but can be fixed by audio restoration.

Many efficient real-time audio restoration algorithms are based on an Autoregressive (AR) model, where stationary random audio signals are modelled as the output of an all-pole filter excited by white noise. In a conventional Single-Channel AR Model, the output of a linear time invariant filter is restricted to a weighted sum of past output values and a white noise input $e_n$.

$$x_n = \sum_{i=1}^{P} a(i)x(n-i) + e_n \quad (1)$$

Restoring a corrupted media segment using the Single-Channel AR Model usually results in various levels of audible distortion, especially if the segment contains voiced speech or music extracts. Additionally, methods built on a Single-Channel AR Model require the adjustment of parameters such as model order and block length, and can lead to reconstructions that are overly smooth in comparison to typical audio signals. AR-based interpolations of long gaps usually show poor performance toward the middle of the gap, as a result of using LS minimisation of modelling error to estimate unknown data. Thus, AR-based interpolation methods are often only suitable for interpolating relatively short gaps of less than 20 ms (where music is stationary).

For a more complete description and analysis of the Single Channel Autoregressive (AR) Model reference can be made to the textbook entitled "Digital Audio Restoration—a statistical model based approach" by Simon J. Godsill and Peter J. W. Rayner, published by Springer & Verlag in 1998.

SUMMARY OF THE INVENTION

In a first aspect the invention provides a method of restoring a corrupted audio signal comprising the steps of;

inputting the corrupted audio signal in a first channel, inputting a second correlated audio signal in a second channel, and restoring the corrupted audio signal using a Multi-Channel Autoregressive (AR) Model that models the corrupted signal as a linear combination of scaled time shifted portions of the second signal and the corrupted signal.

By using the present invention problems associated with using a Single-Channel AR Model to restore corrupted audio segments can be reduced. The output of a linear time invariant filter of a specific channel can be modelled as a weighted sum of past output collected from a specified channel, along with the time-shifted values collected from other channels, plus a white noise constant $e_n$. Such a Multi-Channel AR Model can then be used in real-time restoration of the multi-channel audio.

Multi-Channel Autoregressive (AR) Model builds on the observation that since multi-channel audio media contain various channels with redundant data, it is likely that not all the data will be corrupted at any given time. The observation draws evidence from modern stereo recordings, especially of the pop genre, where multiple independent channels transmit essentially mono recordings with phase shifts and cross fading between the channels to create a sense of surround audio source.

The Multi-Channel AR Model may use the following equations for interpolation;

$$x_1(n) = \sum_{i=1}^{P_1^1} a_1^1(i)x_1(n-i) + \sum_{j=1}^{P_2^1} a_2^1(j)x_2(n-j+\tau_2^1) + \sum_{k=1}^{P_3^1} a_3^1(k)x_3(n-k+\tau_3^1) + \ldots + e_{n1} \quad (2)$$

Similarly:

$$x_m(n) = \sum_{i=1}^{P_m^m} a_m^m(i)x_m(n-i) + \sum_{j=1}^{P_1^m} a_1^m(j)x_1(n-j+\tau_1^m) + \sum_{k=1}^{P_2^m} a_2^m(k)x_2(n-k+\tau_2^m) + \ldots + e_{nm} \quad (3)$$

$x_1, x_2, \ldots, x_m$, are outputs of channel 1, 2, . . . , m $a_j^i$ are AR coefficients between channels i, j $P_j^i$ are orders of AR coefficients between channels i, j $\tau_j^i$ are time-shifting constants between channels i, j $e_{n1}, e_{n2}, \ldots, e_{nm}$ are white noise inputs When there are two channels, the Multi-Channel AR Model may use the following equations for interpolation;

$$x_1(n) = \sum_{i=1}^{P_1^1} a_1^1(i)x_1(n-i) + \sum_{j=1}^{P_2^1} a_2^1(j)x_2(n-j+\tau_2^1) + e_{n1} \quad (4)$$

-continued $$x_2(n) = \sum_{i=1}^{P_2^2} a_2^2(i) x_2(n-i) + \sum_{j=1}^{P_1^2} a_1^2(j) x_1(n-j+\tau_1^2) + e_{n2} \quad (5)$$

In a second aspect the invention provides a method of reproducing a DAB audio signal comprising the steps of;

receiving and decoding a DAB signal to produce corresponding audio packets, receiving an analogue broadcast signal broadcast simultaneously with the DAB signal and containing the same broadcast programme, demodulating the analogue broadcast signal to produce an analogue audio signal therefrom, converting the analogue audio signal to a digitised analogue audio signal, entering DAB audio packets and digitised analogue audio packets into respective buffer stores to provide appropriate delays compensating time differences between DAB and digitised analogue audio packets, detecting corrupted or absent DAB packets, and restoring the corrupted DAB packets using a Multi-Channel AR Model of the DAB and digitised analogue audio channels to interpolate missing or corrupted DAB packets.

DAB receivers when receiving weak signals may experience loss of data packets. Because of the nature of digital transmission the sound quality then becomes degraded and unstable resulting in the reproduced audio exhibiting "clicks", "pops", "drop-offs", or "silences".

Currently many radio stations transmit analogue (FM or AM) and digital radio signals at the same time (usually with a short delay on the digital signal due to the time required to encode it) at different frequencies. Most DAB radio receivers/tuners are capable of receiving and decoding/demodulating both DAB and FM/AM signals.

By demodulating/decoding both the FM/AM and DAB signals simultaneously DAB packets may be predicted and restored using a Multi-Channel AR Model utilising the DAB packets and digitised audio produced from the FM/AM signal. This gives a better performance than the currently used feature on DAB radios of merely switching to the FM/AM signal when DAB reception falls below a given threshold.

The Multi-Channel AR Model may use the equation $$x_1(n) = \sum_{i=1}^{P_1^1} a_1^1(i) x_1(n-i) + \sum_{j=1}^{P_2^1} a_2^1(j) x_2(n-j+\tau_2^1) + e_{n1},$$

where $x_1$ is the DAB signal and $x_2$ is the digitised analogue audio signal, in order to interpolate the DAB packets.

In one embodiment the DAB packets are replaced by digitised analogue audio signals when the missing and/or corrupted DAB packets extend for longer than a preset period.

Reception of uncorrupted packets after a long period when they were not being received may be effective to restore interpolation of DAB packets within a further preset period before the first uncorrupted DAB packet after a gap greater than the first preset period.

In a third aspect the invention provides a radio receiver comprising a DAB decoder, an analogue broadcast receiver including a demodulator for producing an analogue audio signal, a first buffer store for storing a succession of decoded DAB audio packets, an analogue to digital converter for digitising the analogue audio signal, a second buffer store for storing a succession of digitised signal samples, a packet detector for determining whether DAB packets are missing, corrupted, or uncorrupted and for producing a packet loss indicator dependent thereon, and a digital signal processor having inputs for receiving DAB packets, digitised analogue audio, and the packet loss indicator; wherein the digital signal processor is arranged to implement a Multi-Channel AR Model so as to enable interpolation of the corrupted DAB packets and the digitised analogue audio.

The digital signal processor may be programmed to use the equation $$x_1(n) = \sum_{i=1}^{P_1^1} a_1^1(i) x_1(n-i) + \sum_{j=1}^{P_2^1} a_2^1(j) x_2(n-j+\tau_2^1) + e_{n1} \quad (4)$$

where $x_1$ is the DAB signal and $x_2$ is the digitised analogue audio signal, in order to interpolate the DAB packets.

When gaps between uncorrupted DAB packets exceed a given period digitised analogue audio may be used to replace the DAB packets.

Interpolated DAB packets may be used within a second smaller period adjoining uncorrupted DAB packets.

In a fourth aspect the invention provides a mobile telephone arranged to receive radio frequency signals carrying audio signals modulated thereon and producing first and second correlated audio signals therefrom and a signal processor having first and second inputs for receiving the first and second audio signals and an output from which a processed audio signal may be derived, the signal processor being arranged to implement a Multi-Channel AR Model so as to enable interpolation of corrupted audio signals.

Such a mobile telephone may take a variety of forms, the requirement being that two correlated audio signals are made available to a processor implementing the Multi-Channel AR Model. Thus the use of a RAKE receiver will produce multiple audio signals from multiple delayed received radio signals. Such multiple delayed signals arise from reflections of the signal between the base station and the mobile telephone. Other possibilities include diversity reception where a plurality of spaced apart antennas are used either at the base station or at the mobile telephone or at both. A corresponding plurality of RF channels may be provided in the mobile telephone or a single RF channel time division multiplexed between the various antenna signals may be used.

Further options for generating two correlated audio channels include providing a mobile telephone with a SIM card supporting two or more identities and using a 'Multi Party Protocol' to combine the signal.

In a fifth aspect the invention provides a voice over Internet protocol (VOIP) or wireless fidelity (WI-FI) telephone comprising a decoder arrangement for decoding a plurality of correlated audio signals received over a plurality of different paths and a signal processor for receiving said plurality of decoded audio signals and implementing a Multi-Channel AR Model to enable interpolation of corrupted audio signals to produce a processed audio output signal.

BRIEF DESCRIPTION OF THE DRAWINGS

The above and other features and advantages of the invention will be apparent from the following description, by way of example, of an embodiment of the invention with reference to the accompanying drawings, in which:—

DETAILED DESCRIPTION OF PREFERRED EMBODIMENTS

Figure 1:
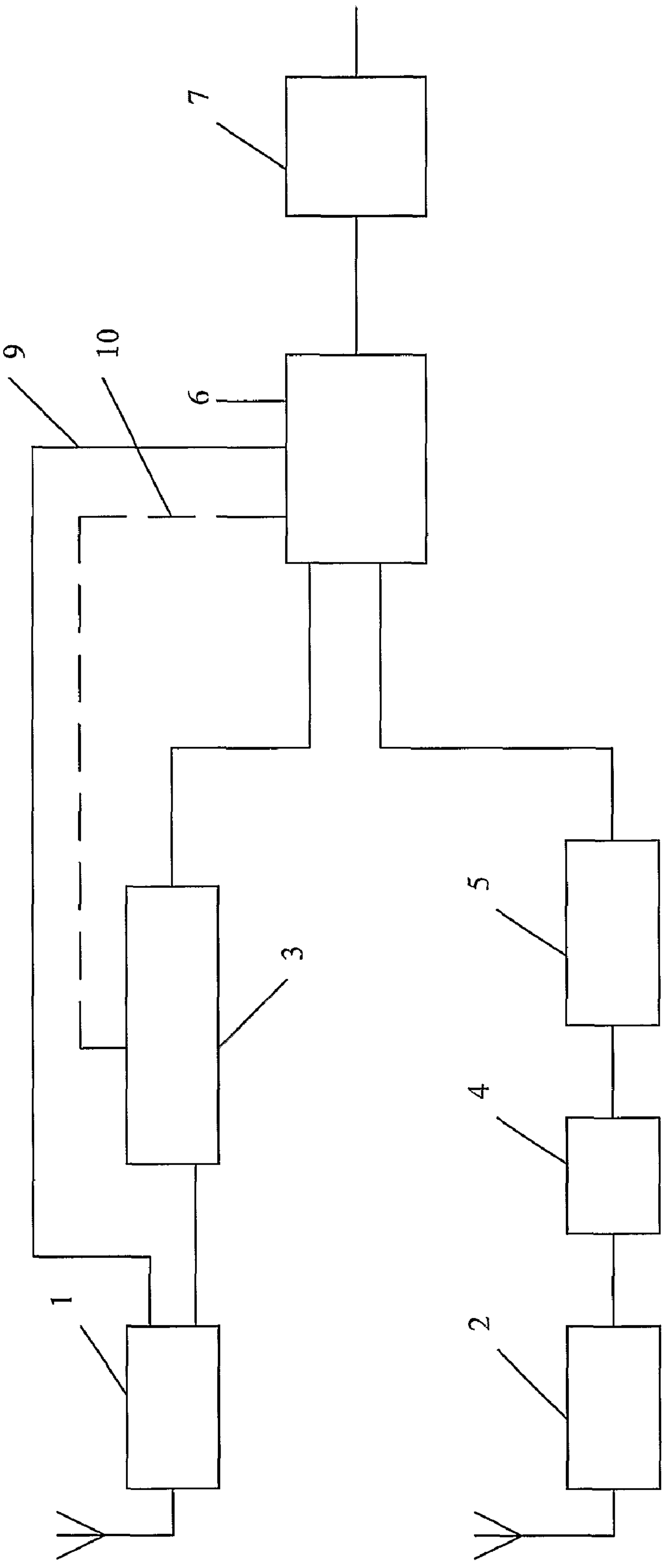
FIG. 1 shows in block schematic form a DAB receiver incorporating the invention.

FIG. 1 illustrates a radio receiver comprising a DAB receiver 1 and an analogue FM receiver 2. In operation, the DAB receiver 1 and analogue FM receiver 2 are both tuned to the same broadcast programme. Currently within the UK many radio broadcast stations transmit analogue and digital radio signals at the same time (ignoring any time offsets due to signal processing delays). Many DAB radio receivers/tuners have the capability of receiving both DAB and FM/AM analogue broadcasts. In the embodiment shown in FIG. 1 a first output of the DAB receiver, that is audio data packets, are fed to a buffer 3 that stores these packets as a first in-first out (FIFO) buffer. Similarly the output from the FM tuner is digitised in an analogue to digital converter 4 and fed to a FIFO buffer 5. The lengths of the buffers 3 and 5 may be selected to compensate for time offsets between the DAB and analogue signals caused by signal processing delays.

The outputs of the buffers 3 and 5 are fed to a digital signal processor 6 in which a Multi-Channel AR Model is implemented in order to restore any DAB packets that are corrupted using the digitised analogue signal. It will be appreciated that the DAB and analogue signals do not have the same characteristics in terms of frequency range and amplitude dynamic range although the programme content is identical. Consequently, it is proposed to use the digitised analogue signal to restore corrupted DAB packets where possible rather than to substitute the analogue signal when the DAB signal is weak.

The lengths of the buffers 3 and 5 are such as to enable the digitised analogue audio signal to be aligned with the equivalent DAB packets and will consequently compensate for any time offsets between the DAB and FM/AM broadcasts and differences in the time taken to decode the DAB audio packets and demodulate the FM/AM signal and digitise the resulting analogue audio signal.

The DAB receiver 1 produces a packet loss indicator signal, which is coupled to the DSP6 over line 9, that when one or more DAB packets is/are lost will cause the DSP6 to implement the Multi-Channel AR Model to interpolate the lost DAB packets using DAB packet history and the digitised analogue audio. Provided that the loss of DAB packets does not extend to greater than a given period, the present algorithm will enable interpolation up to about 120 msecs, the missing DAB packets can be restored to provide an audio output with little degradation. If the loss of packets extends over a longer period then digitised analogue audio is substituted for the DAB packets in the central part of the longer periods while the ends are interpolated using the DAB packets and FM/AM digitised audio and the Multi-Channel AR Model.

The packet loss indicator signal produced by the DAB receiver may use an indicator from the decoder when the packet is unrecognised or the check sum is incorrect. Since the decoder will normally produce a zero output when a packet is not received or is found to be corrupted an alternative is to monitor the amplitude of the digital packet in the buffer store and produce the packet loss indicator signal accordingly that is applied to the DSP6 over a line 10.

In general terms the Multi-Channel AR Model uses the following equations for interpolation:

$$x_1(n) = \sum_{i=1}^{P_1^1} a_1^1(i)x_1(n-i) + \sum_{j=1}^{P_2^1} a_2^1(j)x_2(n-j+\tau_2^1) + \sum_{k=1}^{P_3^1} a_3^1(k)x_3(n-k+\tau_3^1) + \ldots + e_{n1} \tag{2}$$

Similarly:

$$x_m(n) = \sum_{i=1}^{P_m^m} a_m^m(i)x_m(n-i) + \sum_{j=1}^{P_1^m} a_1^m(j)x_1(n-j+\tau_1^m) + \sum_{k=1}^{P_2^m} a_2^m(k)x_2(n-k+\tau_2^m) + \ldots + e_{nm} \tag{3}$$

$x_1, x_2, \ldots, x_m$, are outputs of channel 1, 2, . . . , m $a_j^i$ are AR coefficients between channels i, j $P_j^i$ are orders of AR coefficients between channels i, j $\tau_j^i$ are time-shifting constants between channels i, j $e_{n1}, e_{n2}, \ldots, e_{nm}$ are white noise inputs In the simplified two-channel case the following equations are used.

$$x_1(n) = \sum_{i=1}^{P_1^1} a_1^1(i)x_1(n-i) + \sum_{j=1}^{P_2^1} a_2^1(j)x_2(n-j+\tau_2^1) + e_{n1} \tag{4}$$

$$x_2(n) = \sum_{i=1}^{P_2^2} a_2^2(i)x_2(n-i) + \sum_{j=1}^{P_1^2} a_1^{21}(j)x_1(n-j+\tau_1^2) + e_{n2} \tag{5}$$

In most cases ($P_1^1=P_2^2$, $P_2^1=P_1^2$, and $\tau_2^1=-\tau_1^2$). Please note each equation above is independent and restores only one channel of the audio at a time. Other channels used for restoration are assumed to be uncorrupted. In the case where both channels are corrupted the equations above can still be used, but the performance will be close to the single-channel model.

When $\tau$, the time shifting constant, is greater than one, future data from other channels are used. The usage of future data maintains an automatic update of energy. When two channels are similar, the restoration process is at its near perfect state. Conversely, when two channels are dissimilar, the computation approaches that of which is generated by the Single-Channel AR Model. Thus, in most cases, the Two-Channel AR Model can be expected to outperform the Single-Channel AR Model.

It should be noted that instead of introducing a delay term, for simplicity, a real-time delayed buffer is implicitly assumed that is greater than $\tau_2^{1}$ and $\tau_1^{2}$ so future data points can be made accessible in real-time.

A Two-Channel LSAR interpolator may be implemented by modifying the Single-Channel LSAR interpolator described in the text book referred to above, in particular at pages 86 to 89, the contents of which are hereby incorporated by reference.

Equation (4) is then rewritten as $x_1 = Ga + e$ where N is the total length of the audio section; $x_1$ and e are now $(N-P_1^{1}\times 1)$ column vectors; a is $((P_1^{1}+P_2^{1})\times 1)$ column vector containing AR coefficients of $a_1^{1}(i)$ and $a_2^{1}(j)$.

$\tau_2^{1} = -\tau_1^{2}$ is then estimated by finding the index of maximum cross correlation value between $x_1$ and $x_2$. G is now a matrix containing both $x_1$ and time-shifted $x_2$:

$$\begin{bmatrix} x_1(P_1^1) & \dots & x_1(1) & x_2(P_1^1+\tau_2^1) & \dots & x_2(P_1^1+\tau_2^1-P_2^1) \\ x_1(P_1^1+1) & \dots & x_1(2) & x_2(P_1^1+\tau_2^1+1) & \dots & x_2(P_1^1+\tau_2^1-P_2^1+1) \\ \vdots & \ddots & \vdots & \vdots & \ddots & \vdots \\ x_1(N-2) & \dots & x_1(N-P_1^1-1) & x_2(N+\tau_2^1-1) & \dots & x_2(N+\tau_2^1-P_2^1-1) \\ x_1(N-1) & \dots & x_1(N-P_1^1) & x_2(N+\tau_2^1) & \dots & x_2(N+\tau_2^1-P_2^1) \end{bmatrix}$$

We can solve for the least squares estimate of a using covariance estimate:

$$a^{cov} = (G^T G)^{-1} G^T x_1$$

We can rewrite the equation to:

$$e = Ax$$

where x is now a concatenated column vector containing values of $x_1$ and $x_2$, and A is the appropriate matrix containing $a_1^{1}(i)$ and $a_2^{1}(j)$ coefficients:

$$\begin{bmatrix} -a_1^1(P_1^1) \ \dots \ -a_1^1(1) 1\ 0 \ \dots \ 0 - a_2^1(P_2^1) \ \dots \ -a_2^1(1)\ 0 \ \dots \ 0\ 0 \\ 0 - a_1^1(P_1^1) \ \dots - a_1^1(1)\ 1\ 0 \ \dots \ 0\ 0 - a_2^1(P_2^1) \ \dots - a_2^1(1)\ 0 \ \dots \ 0 \\ \vdots \quad \ddots \quad \ddots \quad \ddots \quad \ddots \quad \ddots \quad \ddots \quad \ddots \quad \vdots \\ 0 \ \dots \ 0 - a_1^1(P_1^1) \ \dots \ -a_1^1(1) 1\ 0 \ \dots \ 0 - a_2^1(P_2^1) \ \dots \ -a_2^1(1)\ 0 \\ 0\ 0 \ \dots \ 0 - a_1^1(P_1^1) \ \dots - a_1^1(1)\ 1\ 0 \ \dots \ 0\ 0 - a_2^1(P_2^1) \ \dots - a_2^1(1) \end{bmatrix}$$

The locations of missing samples can be specified within the data block through a detection switching vector i. A block of N data samples x can then be partitioned according to known and unknown samples $x_{-(i)}$ and $x_{(i)}$ with rearrangement matrix U and K where:

$$x = UX_{(i)} + Kx_{-(i)}$$

Further, we define $A_{(i)} = AU$ and $A_{-(i)} = AK$, and the solution for two-channel LSAR interpolator is:

$$x_{(i)}^{LS2CH} = -(A_{(i)}^{T} A_{(i)})^{-1} A_{(i)}^{T} A_{-(i)} x_{-(i)}$$

Thus in the DAB receiver shown in FIG. 1 the DSP6 receives digital packets $x_1$ digitised audio $x_2$ and a packet loss indicator i and uses these signals to produce interpolated audio when DAB packets are lost. If the packet loss indicator i extends over a long period then digitised audio is substituted as interpolation is no longer valid. The interpolation is, however, advantageous at the beginning and end of the gap in received DAB packets to provide a smooth transition between the DAB and FM/AM audio signals.

It will be appreciated that the buffers 3 and 5 enable past and future values of audio samples, both DAB packets and digitised analogue audio to be accessed by the DSP6 in order to perform the interpolation and allow the length of a gap in reception of DAB packets to be determined, i.e. the number of successive empty (or marked) locations in the buffer. This enables the DSP6 to implement the necessary routines to pass uncorrupted DAB packets to the D/A converter 7 and any subsequent analogue audio processing circuitry, to interpolate the missing DAB packets using the Two-Channel AR model, or when DAB packets are missing for a long period passing digitised analogue audio to the D/A converter 7.

Figure 2:
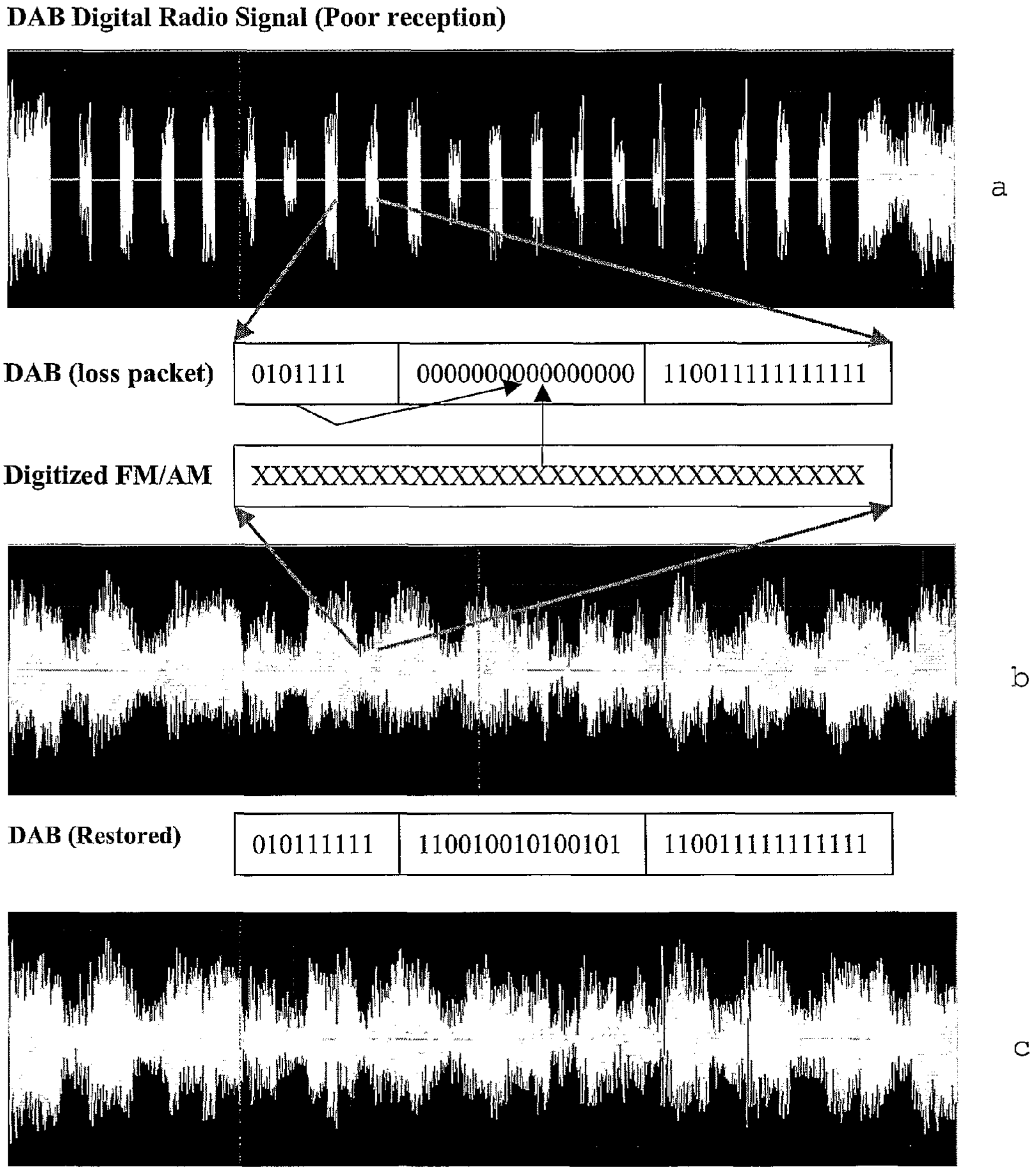
FIG. 2 illustrates DAB packets received under poor reception conditions, corresponding FM/AM signals, and a restored DAB output obtained using the present invention.

FIG. 2 illustrates decoded DAB signals under poor reception conditions and it can be seen from FIG. 2*a* that there are short intervals where there are missing DAB packets. These would normally produce audible artifacts such as "clicks", "pops", "drop-offs" or "silences". In order to alleviate these effects digitised FM/AM audio FIG. 2*b* is used in a Multi-Channel AR Model having the FM/AM audio as one channel. Should reception be such that packets are missing over a longer period, then at the centre of that period where the interpolation is no longer valid, the DSP causes the FM/AM audio to be used instead of the DAB signal. At either end of the gap, however, the restoration of DAB packets is used to ensure a smooth transition between the DAB and FM/AM signals.

While the invention has been described with reference to its use in a DAB receiver capable of also receiving an FM/AM equivalent broadcast it is not limited to such an application but can also be used whenever two or more correlated channels are available. One example is in stereo recordings where the left and right hand channels give the signal samples $x_1$ and $x_2$, or in surround sound recordings where further channels may be present and may be used for restoring the signal in a corrupted channel.

A non-exhaustive list of further possible applications of the method of restoring corrupted audio signals according to the present invention is give below.

1. The invention may be used to restore a copy of corrupted digital media using an inferior copy of the same media, such as old records, cassette tapes, etc.

2. The invention may be used to restore multi language digital media. If one of the media clips, on a medium such as DVD is corrupted, for example in manufacture or in use by scratching, etc., a second uncorrupted channel, in a different language, can be used to restore the first.

3. The invention may be used to restore a corrupted digital TV/video audio clip using an uncorrupted analogue TV/video audio clip.

4. The invention may be used to restore corrupted audio files of different compression formats. Often, applications such as assisting Internet streaming audio, VOIP, (real audio, audio portion of streaming Internet video) contains files of the same content, but in different formats. The clips in different formats can then be used to restore one another.

5. The invention may be used to restore a wireless audio clip with an Internet audio clip and vice versa. For example, an uncorrupted Internet clip of DAB broadcast can be used to restore a corrupted wireless broadcast. Also, FM broadcast can be used to restore DAB broadcast over the Internet.

6. The invention may be used to create an intelligent wireless transmission system by using a compressed version of the same audio content as a backup channel, for example if two copies of the same audio are transmitted with different quality the channel with the lower bandwidth (for example 8 bit 8 KHz) can be used to restore the channel with the high bandwidth (for example 16 bit 44 KHz) and vice versa.

7. The invention may be used to restore indoor mobile phone reception using one or more different wireless audio transmission standard(s) as backup channels. For example, a voice or music clip that is transmitted over an inferior or localised wireless standard such as FM, AM, GPRS, bluetooth, etc., in an indoor environment, can be used to restore corrupted general long distance digital cellular wireless transmission standards, such as GSM, TDMA, CDMA, and vice versa.

A further application of the invention to the restoration of audio signals in mobile telephone applications will be described in more detail hereinafter.

Two or more corrupted mobile telephone audio sources may be restored using the method described herein and/or claimed in claims 1 to 4.

The two or more audio sources may be derived from two or more separate CDMA, W-CDMA (3G), GSM or other cellular standard base stations or from two or more simultaneously transmitted signals. Alternatively the two or more audio sources may be from multiple reflected radio signals from a single base station using a RAKE receiver.

A RAKE receiver uses several baseband correlators to individually process several multipath signal components, that is signals having the same content but delayed by time periods dependent on the path length. The correlator outputs are combined to achieve improved communications reliability and performance.

In IS-95, both the base station and mobile receivers use RAKE receiver techniques. Each correlator in a RAKE receiver is called a RAKE receiver finger. The base station combines the outputs of its RAKE receiver fingers noncoherently, i.e. the outputs are added in power. The mobile receiver combines its RAKE receiver finger outputs coherently, i.e. the outputs are added in voltage. Currently mobile receivers generally have three RAKE receiver fingers and base station receivers have four or five depending on the equipment manufacturer. There are two primary methods currently used to combine the RAKE receiver finger outputs. One method weights each output equally and is, therefore, called equal-gain combining. The second method uses the data to estimate weights which maximise the Signal-to-Noise Ratio (SNR) of the combined output. This technique is known as maximal-ratio combining. In practice, it is not unusual for both combining techniques to perform about the same.

A mobile telephone employing a RAKE receiver architecture will have available at the correlator outputs a plurality of radio signals having nominally the same information but delayed with respect to each other. These radio signals can be demodulated and decoded to produce a corresponding plurality of audio channels having nominally the same audio signals. If one or more of these audio channels is corrupted it can be restored using a multi channel autoregressive model as described above that models the corrupted signal as a linear combination of scaled time shifted portions of the audio signals derived from the other audio channels and the corrupted signal. This will give an improved output audio signal.

While a RAKE receiver provided with a signal processor that receives the outputs of the correlators after demodulation and decoding to provide multiple audio channels and applies the Multi-Channel AR Model process described above to those audio channel outputs to provide an improved received audio signal is a convenient implementation it is not essential to use such a receiver. The requirement is that the mobile telephone is able to receive two or more versions of the audio signal and to combine these two versions using the Multi-Channel AR Model.

There are other means for receiving multiple delayed signals such as providing a plurality of antennas each feeding either a separate physical RF path or being time division multiplexed onto a single physical RF path. Such diversity receivers are well known in the radio communications art.

Figure 3:
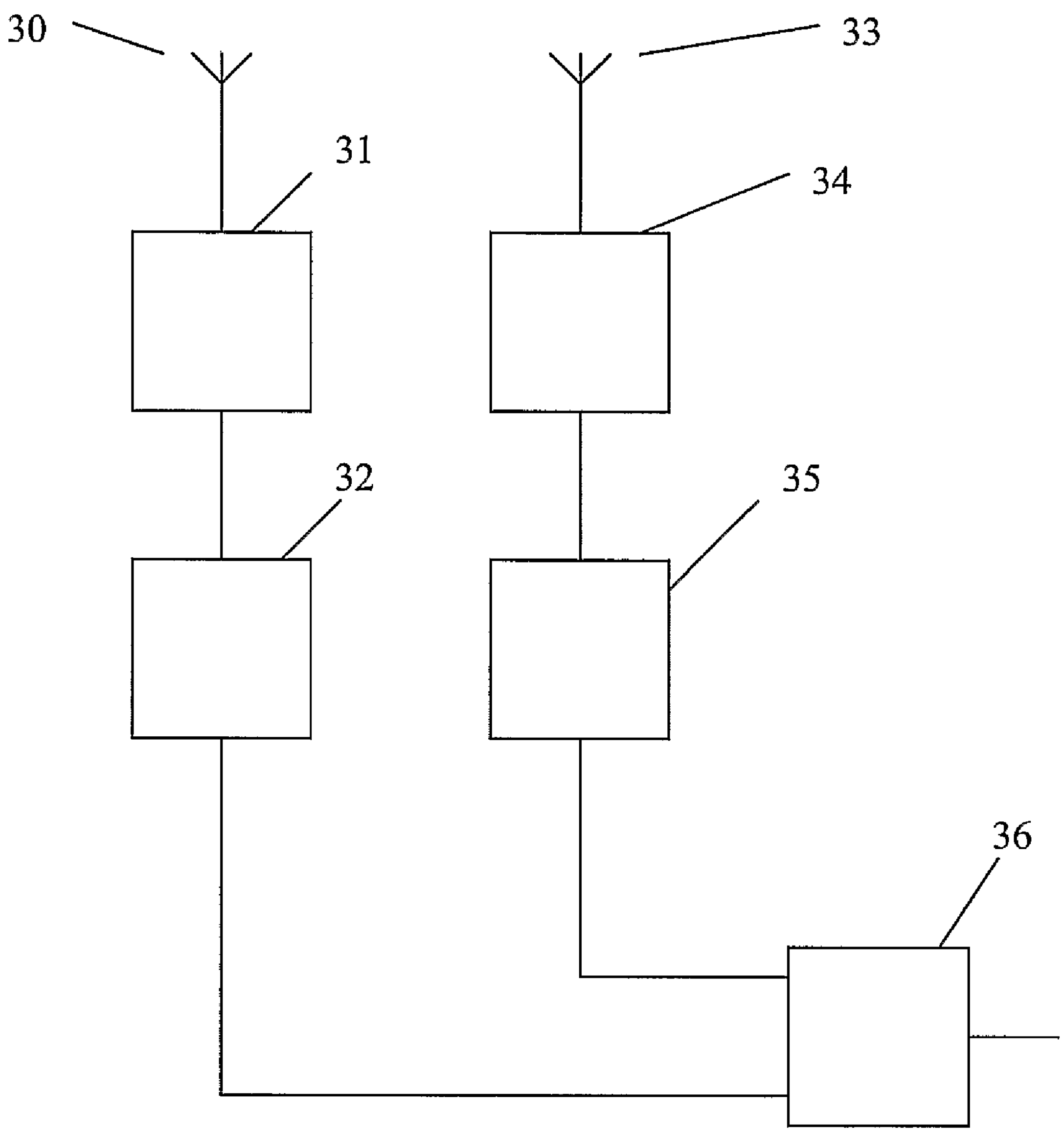
FIG. 3 shows a block schematic diagram of one embodiment of a mobile telephone incorporating the invention.

FIG. 3 shows in block schematic form an embodiment of a mobile telephone according to the invention. As shown in FIG. 3 the mobile telephone has a first antenna 30 from which feeds a first received signal to a first RF stage 31 where the first signal is demodulated and fed to a first AF stage 32. A second antenna 33 feeds a second received signal to a second RF stage 34 where the second signal is demodulated and fed to a second AF stage 35. The two audio signals are fed to first and second inputs of a signal processor 36. The signal processor 36 may be a microprocessor or a programmable digital signal processor that is programmed to implement a Multi-Channel AR Model in order to restore lost or corrupted audio samples in the first audio signal using a weighted sum of past samples from that signal with time shifted samples from the other audio channels(s). It should be noted that while the example in FIG. 3 uses two channels, more than two channels could be provided, as is the case with the RAKE receiver.

One way of providing a mobile telephone with two separate audio channels is to provide the telephone with a SIM card that will support two or more numbers (identities) and use the 'Multi-Party Protocol' to combine the signal. SIM cards that support multiple numbers are currently available.

Figure 4:
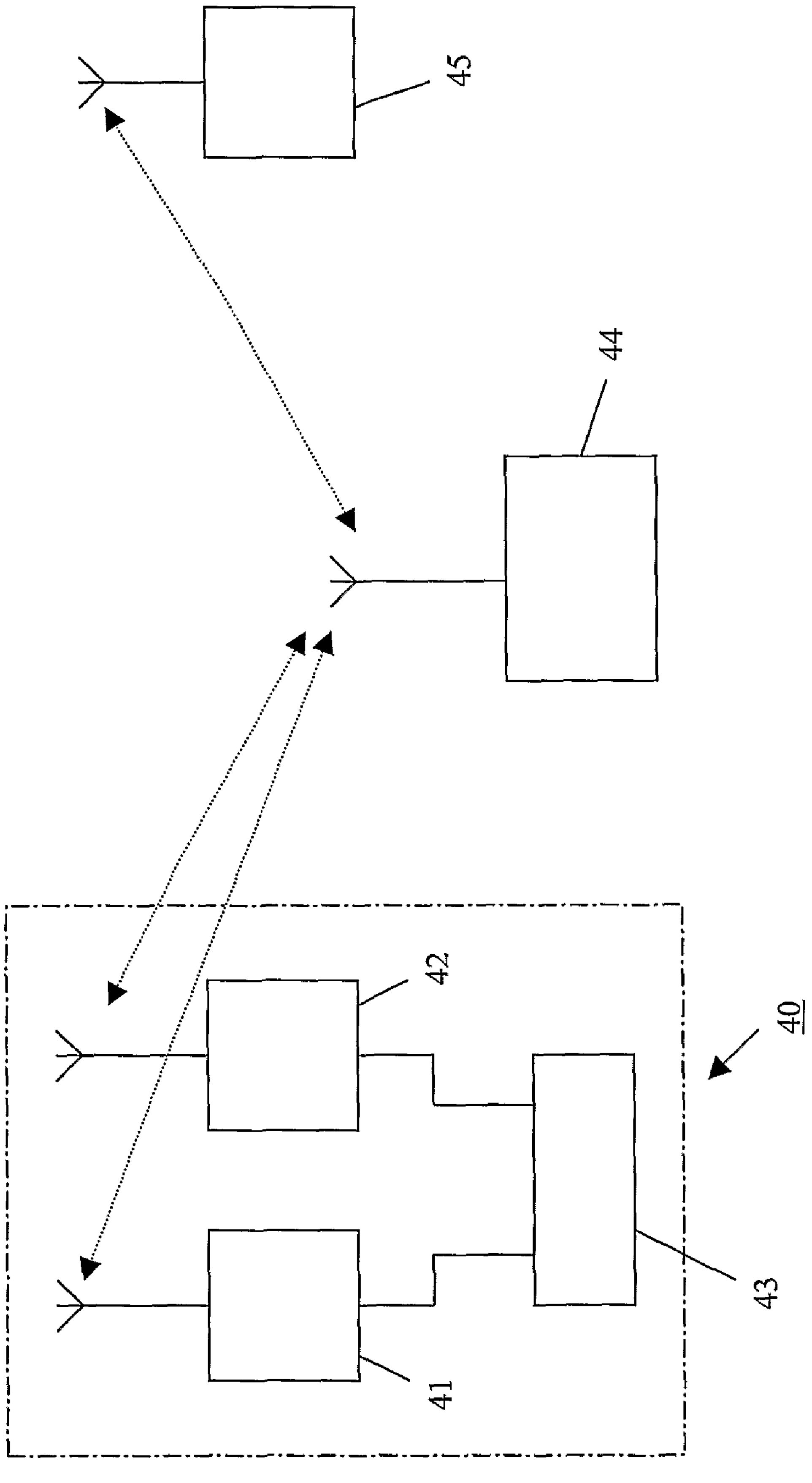
FIG. 4 shows a block schematic diagram illustrating one embodiment of mobile telephone communication using a mobile telephone according to the invention.

FIG. 4 illustrates in block schematic form such an arrangement. As shown in FIG. 4 a mobile telephone 40 having two identities 41 and 42 and a signal processor 43 transmits to and receives from a base station 44. A further mobile telephone 45 transmits to and receives from the base station 44. Using the 'Multi-Party Protocol' the transmissions from the mobile telephone 45 are fed to both paths 41 and 42, that is the base station 44 transmits the signal from the mobile telephone 45 to both identities 41 and 42 where they are separately received and the two resultant audio channels are processed in the signal processor 43 according to the Multi-Channel AR Model as described herein using equations 4 and 5 where only two audio channels are present or equations 2 and 3 where more than two audio channels are available.

Another implementation is to use a mobile telephone able to receive/transmit using two (or more) different standards, for example GSM and CDMA. The outputs of the GSM and CDMA channels can be combined using the Multi-Channel AR Model. This assumes that correlated audio signals are transmitted over networks using the two (or more) standards.

Various other transmission/reception combinations may be implemented, the requirement being that two correlated audio signals can be produced to enable the Multi-Channel AR Model to be applied to improve the quality of the audio signal produced.

A further application of this invention to mobile telephone communications is during weak reception or handover between mobile telephone cells the mobile telephone may connect two different base stations simultaneously. This may be achieved using time division multiplexing techniques or by having two physically separate RF channels and antennas, one transmitting to and receiving from a first base station and the other transmitting to and receiving from a second base station. While receiving from both base stations the mobile telephone will be receiving radio signals encoding the same or a similar audio signal and consequently when the mobile telephone has demodulated and decoded the received audio signals they can be applied to the signal processor where they are processed according to the Multi-Channel AR Model as described above. Thus where two base stations are available and, in particular, where the signal from one or both of them is weak the two audio signals can be applied to the signal processor where the Multi-Channel AR Model is implemented to improve the quality of the received audio signal.

Figure 5:
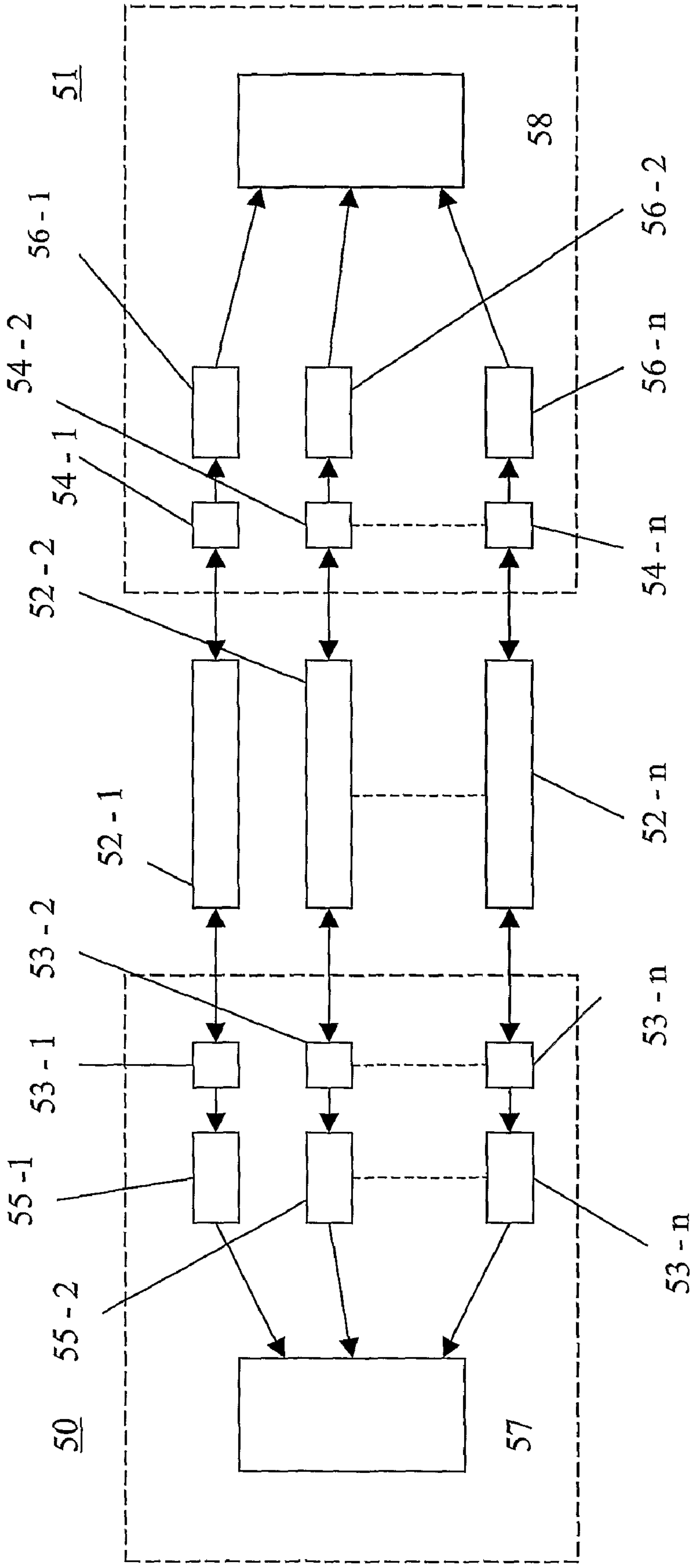
FIG. 5 shows a block schematic diagram illustrating one embodiment of a voice over Internet protocol (VOIP) communication using VOIP telephones according to the invention.

A still further application of this invention is to voice over Internet protocol (VOIP) telephones or wireless fidelity (WI-FI) telephones to improve audio quality and perceived reception. As shown in FIG. 5 a first VOIP (or WI-FI) telephone 50 communicates with a second VOIP (or WI-FI) telephone 51 over a plurality of paths 52-1 to 52-*n*. The telephone 50 has a plurality of Internet ports 53-1 to 53-*n*, while the telephone 51 has a plurality of Internet ports 54-1 to 54-*n* through which communication can be established over the paths 52-1 to 52-*n*. The telephone 50 has decoders 55-1 to 55-*n* that take the incoming signal from the ports 53-1 to 53-*n* and convert them into individual audio signals. Similarly the telephone 51 has decoders 56-1 to 56-*n* that take the incoming signals from the ports 54-1 to 54-*n* and convert them into individual audio signals. The decoders 55-1 to 55-*n* (and the decoders 56-1 to 56-*n*) may be individual decoders or may be formed by a pipelined decoder arrangement.

Each of the telephones 50 and 51 has embedded therein an appropriate signal processing arrangement 57 and 58, respectively, that receive the decoded audio signals from the decoders 55-1 to 55-*n* and 56-1 to 56-*n* and are programmed to implement a method of restoring a corrupted audio signal according to any of claims 1 to 3 and/or as described herein and produce a restored audio signal at their respective outputs. The signal processing arrangements 57 and 58 will typically comprise an appropriately programmed digital processor.

Thus two or more channels of similar audio information in the form of audio packets are transmitted through two or more separate Internet paths between two or more VOIP telephones. Each separate path can be via different Internet ports on the VOIP telephone, different wireless hotspots, different ports on the same wireless hotspot/access point, or different network service provider. The audio channels may separately contain packets of different codec/standard, packets with different added white noise, background noise or noise due to packet loss, packets with different mean amplitude, or packets with different time alignment, offset, or delay. Each channel of audio is decoded separately and the audio signal restored using a Multi-Channel AR Model algorithm as described and claimed herein.

Use of a method according to the invention can improve the audio quality of a VOIP telephone through placing and combining two or more calls to another VOIP telephone. When the reception is poor, additional calls can be placed while not interrupting the existing call. Subsequently, all calls are combined with a Multi-Channel AR Model restoration algorithm to improve the reception.

The ports 53-1 to 53-*n* and 54-1 to 54-*n* may take the output from a single encoder that encodes the audio signal for transmission over different transmission paths to the other telephone. Alternatively a plurality of encoders, one for each port, may be provided, in which case the encoding of the audio signals to be transmitted over the different transmission paths may be according to different standards. The different transmission paths may be separated in space, in time, or in frequency.

Each of the telephones will, of course, also include conventional units required for operation such as digital to analogue converter for converting the audio signal produced at the output of the signal processor 57 (58) and an audio amplifier and speaker. Also for transmission an appropriate microphone, analogue to digital converter, and encoder to apply an encoded audio signal to the Internet ports. All these components and their interconnections will be known to the person skilled in the art and are not part of the inventive concept and consequently are not shown in the drawings and will not be described further.

Thus the Multi-Channel AR Model restoration algorithm can be applied to VOIP or WI-FI telephones that support multiple standards, for example, a multi-standard WIFI/UMA/GAN/GSM/3G/CDMA/telephone. The algorithm can improve the audio quality by combining simultaneous different standard calls, assuming each call can be decoded separately. The algorithm can also assist switching between one standard and another standard without interrupting the call. A call in one standard (for example, WI-FI) can be placed first and then another call in another standard (for example, GSM) is then placed later and the call with poorer reception will be dropped after smoothing the switchover by means of the Multi-Channel AR Model algorithm.

In addition, the algorithm can assist handover between one standard cellular standard to another standard cellular standard without interrupting the call in a similar manner.

Existing multi-party or 3-way calling protocol of a WI-FI standard and mobile standards can also be applied to assist the Multi-channel restoration algorithm.

What is claimed is:

1. A method of restoring a corrupted audio signal comprising the steps of:

inputting the corrupted audio signal in a first channel, inputting one or more further correlated audio signals in one or more further channels, and restoring the corrupted audio signal using a mathematical model that models the corrupted signal as a linear combination of scaled time shifted portions of the further signal(s) and the corrupted signal, in which the mathematical model uses the following equations:

$$x_1(n) = \sum_{i=1}^{P_1^1} a_1^1(i)x_1(n-i) + \sum_{j=1}^{P_2^1} a_2^1(j)x_2(n-j+\tau_2^1) + \sum_{k=1}^{P_3^1} a_3^1(k)x_3(n-k+\tau_3^1) + \ldots + e_{n1}$$

$$x_m(n) = \sum_{i=1}^{P_m^m} a_m^m(i)x_m(n-i) + \sum_{j=1}^{P_1^m} a_1^m(j)x_1(n-j+\tau_1^m) + \sum_{k=1}^{P_2^m} a_2^m(k)x_2(n-k+\tau_2^m) + \ldots + e_{nm}$$

wherein $x_1, x_2, \ldots, x_m$, are outputs of channel 1, 2, . . . , m;

$a_j^i$ are model coefficients between channels i, j;

$P_j^i$ are orders of model coefficients between channels i, j;

$\tau_j^i$ are time-shifting constants between channels i, j; and $e_{n1}, e_{n2}, \ldots, e_{nm}$ are white noise inputs.

2. A method as claimed in claim 1 in which the mathematical model is referred to as one of the Multi-Channel AR Model and an inter-channel cross-correlated Model.

3. A method as claimed in claim 1 in which there are two channels and the mathematical model uses the following equations for interpolation:

$$x_1(n) = \sum_{i=1}^{P_1^1} a_1^1(i)x_1(n-i) + \sum_{j=1}^{P_2^1} a_2^1(j)x_2(n-j+\tau_2^1) + e_{n1}$$

$$x_2(n) = \sum_{i=1}^{P_2^2} a_2^2(i)x_2(n-i) + \sum_{j=1}^{P_1^2} a_1^2(j)x_1(n-j+\tau_1^2) + e_{n2}.$$

4. A method of reproducing a DAB audio signal comprising the steps of;

receiving and decoding a DAB signal to produce corresponding audio packets, receiving an analogue broadcast signal broadcast simultaneously with the DAB signal and containing the same broadcast programme, demodulating the analogue signal to produce an analogue audio signal therefrom, converting the analogue audio signal to a digitised analogue audio signal, entering DAB audio packets and digitised analogue audio packets into respective buffer stores to provide appropriate delays compensating time differences between the DAB and digitised analogue audio packets, detecting corrupted or absent DAB packets, and restoring the corrupted DAB packets using a Multi-Channel AR Model of the DAB and digitised analogue audio channels to interpolate missing or corrupted DAB packets.

5. A method as claimed in claim 4 in which the Multi-Channel AR Model uses the equation, $$x_1(n) = \sum_{i=1}^{P_1^1} a_1^1(i)x_1(n-i) + \sum_{j=1}^{P_2^1} a_2^1(j)x_2(n-j+\tau_2^1) + e_{n1}.$$

6. A method as claimed in claim 4 in which the DAB packets are replaced by digitised analogue audio signals when the missing and/or corrupted DAB packets extend for longer than a preset period.

7. A method as claimed in claim 6 in which reception of uncorrupted packets after a long period when they were not being received is effective to restore interpolation of DAB packets within a further preset period before the first preset period.

8. A radio receiver comprising a DAB decoder, an analogue broadcast receiver including a demodulator for producing an analogue audio signal, a first buffer store storing a succession of decoded DAB audio packets, an analogue to digital converter for digitising the analogue audio signal, a second buffer store for storing a succession of digitised signal samples, a packet detector for determining whether DAB packets are missing, corrupted, or uncorrupted and for producing a packet loss indicator dependent thereon, and a digital signal processor having inputs for receiving DAB packets, digitised analogue audio, and the packet loss indicator; wherein the digital signal processor is arranged to implement a Multi-Channel AR Model so as to enable interpolation of the corrupted DAB packets using data derived from the DAB packets and the digitised analogue audio.

9. A radio receiver as claimed in claim 8 in which the digital signal processor is programmed to use the equation:

$$x_1(n) = \sum_{i=1}^{P_1^1} a_1^1(i)x_1(n-i) + \sum_{j=1}^{P_2^1} a_2^1(j)x_2(n-j+\tau_2^1) + e_{n1}$$

where $x_1$ is the DAB signal and $x_2$ is the digitised analogue audio signal to interpolate DAB packets.

10. A radio receiver as claimed in claim 8 in which, when gaps between uncorrupted DAB packets exceed a given period, digitised analogue audio is used to replace the DAB packets.

11. A radio receiver as claimed in claim 9 in which interpolated DAB packets are used within a second smaller period adjoining uncorrupted DAB packets.

12. A telephone including a signal processor for receiving a plurality of audio signals, said signal processor being arranged to implement a Multi-Channel AR Model so as to enable interpolation of corrupted audio signals, wherein said telephone is a mobile telephone receiving radio frequency signals carrying audio signals modulated thereon and producing first and second correlated audio signals therefrom, said signal processor has first and second inputs for receiving the first and the second correlated audio signals and an output from which a processed audio signal may be derived, and said signal processor implements said Multi-Channel AR Model so as to enable an interpolation of said corrupted audio signals.

13. A mobile telephone as claimed in claim 12 having first and second time division multiplexed radio frequency signal paths for receiving first and second radio frequency signals or in which the audio signals are applied to a time division multiplexed audio path.

14. A mobile telephone as claimed in claim 12 having two identities or comprising a RAKE receiver.

15. A telephone as claimed in claim 12 wherein said telephone is a voice over Internet protocol (VoIP) or wireless fidelity (WI-FI) telephone comprising a decoder arrangement for decoding a plurality of correlated audio signals received over a plurality of different paths and said signal processor for receiving said plurality of decoded audio signals and implementing said Multi-Channel AR Model to enable interpolation of said corrupted audio signals to produce a processed audio output signal.

16. A telephone as claimed in claim 15 comprising a plurality of ports for receiving packets of data over a plurality of different paths and a decoding arrangement for separately decoding the packets received over the plurality of different paths and producing a plurality of audio signals therefrom.

17. A telephone as claimed in claim 16 comprising an encoder for encoding an audio signal to be transmitted, the output of the encoder being coupled to each of the ports for connection to the plurality of different paths; or comprising a plurality of encoders each encoding the same or a similar audio signal, the output of each encoder being connected to a different one of said ports for transmission over the different paths.

18. A telephone as claimed in claim 17 in which at least one of the encoders encodes the audio signal according to a different standard from the other encoders.

* * * * *

UNITED STATES PATENT AND TRADEMARK OFFICE

CERTIFICATE OF CORRECTION

PATENT NO. : 8,335,579 B2
APPLICATION NO. : 11/916446
DATED : December 18, 2012
INVENTOR(S) : Han Lin It is certified that error appears in the above-identified patent and that said Letters Patent is hereby corrected as shown below:

On the Title page, under item [56] in the publication titled "Digital Audio Restoration—a staistical model based approach," please change "staistical" to --statistical--.

In the Specification:

At column 7, line 50, please change "$x=UX_{(i)}+Kx_{-(i)}$" to --$x=Ux_{(i)}+Kx_{-(i)}$--.

In the Claims:

At column 13, line 44, claim 5, please insert --where $x_1$ is the DAB signal and $x_2$ is the digitised analogue audio signal, in order to interpolate the DAB packets.--.

Signed and Sealed this
Tenth Day of September, 2013

Teresa Stanek Rea
*Acting Director of the United States Patent and Trademark Office*